(12) United States Patent
Nho et al.

(10) Patent No.: US 8,830,150 B2
(45) Date of Patent: Sep. 9, 2014

(54) 3D GLASSES AND A 3D DISPLAY APPARATUS

(75) Inventors: Jeong-ho Nho, Suwon-si (KR); Yong-Dok Cha, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 13/051,195

(22) Filed: Mar. 18, 2011

(65) Prior Publication Data

US 2011/0292010 A1 Dec. 1, 2011

(30) Foreign Application Priority Data

May 28, 2010 (KR) .................. 10-2010-0050178

(51) Int. Cl.
*G09G 3/32* (2006.01)
*H04N 13/04* (2006.01)
*G02B 27/22* (2006.01)

(52) U.S. Cl.
CPC ....... *H04N 13/0438* (2013.01); *H04N 13/0497* (2013.01); *G02B 27/2264* (2013.01); *H04N 2213/008* (2013.01)
USPC .......................................................... 345/82

(58) Field of Classification Search
CPC ....... G09G 3/32; G09G 3/146; G09G 3/3233; F21S 11/00; G02B 3/00; G02B 5/126
USPC .................. 345/82–87; 359/534, 591, 642
See application file for complete search history.

(56) References Cited

U.S. PATENT DOCUMENTS

| | | | |
|---|---|---|---|
| 4,707,604 A * | 11/1987 | Guscott .......................... | 250/342 |
| 4,967,268 A | 10/1990 | Lipton et al. | |
| 5,325,192 A | 6/1994 | Allen | |
| 5,633,498 A | 5/1997 | Savicki | |
| 6,307,521 B1 * | 10/2001 | Schindler et al. ...... | 343/781 CA |
| 6,687,399 B1 | 2/2004 | Chuang et al. | |
| 2005/0180010 A1* | 8/2005 | Mukaiyama et al. ......... | 359/497 |
| 2006/0255275 A1* | 11/2006 | Garman et al. ............ | 250/338.1 |
| 2009/0237327 A1* | 9/2009 | Park et al. .......................... | 345/8 |

FOREIGN PATENT DOCUMENTS

JP 8079799 A 3/1996
JP 08-336167 A 12/1996

OTHER PUBLICATIONS

Communication, dated May 31, 2013, issued by the European Patent Office in counterpart European Patent Application No. 11167738.1.
Communication dated Sep. 16, 2013 issued by the Korean Intellectual Property Office in counterpart Korean Patent Application No. 1020100050178.

* cited by examiner

*Primary Examiner* — Alexander Eisen
*Assistant Examiner* — Mark Regn
(74) *Attorney, Agent, or Firm* — Sughrue Mion, PLLC (57) ABSTRACT

Three-dimensional (3D) glasses according to the present disclosure are interconnected to a 3D display apparatus and include: a glass unit, a glass driving unit which drives the glass unit, an infrared (IR) sensor unit which receives a sync signal transmitted from the 3D display apparatus, a window unit which, when the 3D glasses are directed to the 3D display apparatus, transmits the sync signal to the IR sensor unit and transmits external IR light, incident from a direction different from the direction of the 3D display apparatus, away from the IR sensor unit, and a controlling unit which controls the glass driving unit based on the sync signal.

7 Claims, 10 Drawing Sheets

PLANE WINDOW

FIG. 4B

CURVATURE WINDOW

3D GLASSES AND A 3D DISPLAY APPARATUS

CROSS-REFERENCE TO RELATED APPLICATION

This application claims priority from Korean Patent Application No. 10-2010-050178, filed in the Korean Intellectual Property Office on May 28, 2010, the disclosure of which is incorporated herein by reference in its entirety.

BACKGROUND

1. Field

Apparatuses and methods consistent with exemplary embodiments relate to three-dimensional (3D) glasses and a 3D display apparatus which enable the viewing of 3D images.

2. Description of the Related Art 3D stereoscopic image technology is applicable to various fields such as information communication, broadcasting, medicine, education & training, military, games, animation, virtual reality, computer-aided design (CAD), and industrial technology, and is regarded as a core base technology for the next generation three-dimensional stereoscopic multimedia information communication, which is utilized in all the aforementioned fields.

Generally, a stereoscopic sense that a person perceives occurs from a complex effect, including: the degree of change in thickness of a person's eye lens according to the location of an object being observed, the difference in the angle of the object as perceived by the left and right eyes, the differences in location and shape of the object as perceived by the left and right both eyes, the time difference due to movement of the object, and various other psychological and memory effects.

In particular, binocular disparity, caused by an approximate 6-7 cm lateral distance between a person's left eye and right eye, can be regarded as the main cause of the stereoscopic sense. Due to binocular disparity, the person perceives the object at different angles, which makes the left eye and the right eye perceive different images, and when these two images are transmitted to the person's brain through the retinas, the brain can perceive the original three-dimensional stereoscopic image by combining the two pieces of information precisely.

There are two types of stereoscopic image display apparatuses: glasses-type apparatuses which use special glasses, and non-glasses type apparatuses which do not use such special glasses. A glasses-type apparatus may adopt a color filtering method which separately selects images by filtering colors which are in mutually complementary relationships, a polarized filtering method which separates the images received by a left eye from those received by a right eye using a light-shading effect caused by a combination of polarized light elements meeting at right angles, or a shutter glasses method which enables a person to perceive a stereoscopic sense by blocking a left eye and a right eye alternately in response to a sync signal which projects a left image signal and a right image signal to a screen.

Of the above, the shutter glasses method is a display method which utilizes the binocular disparity between the left and right eyes. It is a method of synchronizing the image provision of the display apparatus with the on/off of the left and right portions of the 3D glasses, so that the images, having different angles can be combined so a user can perceive a sense of 3D space due to the functions of the brain.

That is, using a shutter glasses display method, a user must wear 3D glasses in order to view 3D images, in which case an IR(infrared) wavelength emitter and receiver is used in order to coordinate the signal synchronization between a television (TV) and the 3D glasses. It is possible to improve the sensitivity of signal reception by minimizing the effects of external noise according to the shape of the receiver of the 3D glasses unit and the surrounding structure.

However, conventional 3D glasses were designed without considering such a structure, and thus had a problem that erroneous operations could occur due to various light sources including IR elements. Accordingly, there is a need to provide 3D glasses which are more convenient to users.

SUMMARY

Aspects of exemplary embodiments provide 3D glasses capable of eliminating signal interference and a 3D display apparatus interconnected thereto.

According to an aspect of an exemplary embodiment, there is provided 3D glasses including a glass unit; a glass driving unit which drives the glass unit; an IR sensor unit which receives a sync signal transmitted from a 3D display apparatus; a window unit which, when the 3D glasses are directed to the 3D display apparatus, transmits the sync signal to the IR sensor unit, and transmits external IR light, incident from a direction different from the direction of the 3D display apparatus, away from the IR sensor unit; and a controlling unit which controls the glass driving unit based on the sync signal.

The window unit may have a window having a surface having a curvature which transmits the sync signal, incident from the direction of the 3D display apparatus, in the direction of the IR sensor unit, and transmits first external IR light away from the IR sensor unit, wherein the first external IR light is light incident from a direction different from the direction of the 3D display apparatus; and may include a blocking unit which is disposed on at least one side of the window and blocks second external IR light, wherein the second external IR light is light incident from a direction different from the direction of the 3D display apparatus, to block a second external infrared ray incident.

The blocking unit may include an upper blocking unit disposed on an upper side of the window, where an optical axis of the window may be downwardly offset from a middle of the IR sensor unit.

The blocking unit may include an upper blocking unit disposed on an upper side of the window and a lower blocking unit disposed on a lower side of the window, and a horizontal distance from the middle of the IR sensor unit to the upper blocking unit may be different from a horizontal distance from the middle of the IR sensor unit to the lower blocking unit.

The horizontal distance from the middle of the IR sensor unit to the upper blocking unit may be bigger than the horizontal distance from the middle of the IR sensor unit to the lower blocking unit.

At least one surface of the window may have a convex lens.

The external infrared ray may be at least one of an illumination light or a noise light.

The external infrared ray may be incident on an upper side or a left or right side of the middle of the IR sensor unit.

According to an aspect of another exemplary embodiment, there is provided a 3D display apparatus including an image receiving unit which receives an input 3D image; an image processing unit which divides the input 3D image into a left eye image and a right eye image, and processes the divided images; an image output unit which alternately displays the left eye image and the right eye image processed in the image processing unit; a first transmitting unit which generates a sync signal which is synchronized with the alternately-displayed left eye image and right eye image, and transmits the generated sync signal as an infrared ray shape; a second IR transmitting unit which is disposed above the first IR transmitting unit, and which generates a sync signal which is synchronized with the alternately-displayed left eye image and right eye image, and transmits the generated sync signal as an infrared ray shape; and a controlling unit which controls the image output unit so that the left eye image and the right eye image processed in the image processing unit are time-shared and are alternately displayed.

According to an aspect of another exemplary embodiment, there is provided a 3D display system including the 3D display apparatus and 3D glasses. The 3D glasses may include a window unit which, when the 3D glasses are directed to the 3D display apparatus, transmits the sync signal from at least one of the first IR transmitting unit and the second IR transmitting unit to the IR sensor unit, and transmits external IR light, incident from a direction different from the direction of the 3D display apparatus, away from the IR sensor unit; and a controlling unit which controls the glass driving unit based on the sync signal.

The window unit may include a window which has a surface having a curvature, which transmits the sync signal, incident from the direction of the 3D display apparatus, in the direction of the IR sensor unit, and transmits first external IR light away from the IR sensor unit, where the first external IR light is light incident form a direction different from the direction of the display apparatus; and a blocking unit which is disposed on one side of the window, and blocks second external IR light, wherein the second external IR light is light incident from a direction different from the direction of the display apparatus.

Accordingly, the light signal may be made to be received within a light reception angle of the IR sensor unit, and the external signals such as the noise light and the illumination light may be made to be received beyond the light reception angle.

BRIEF DESCRIPTION OF THE DRAWINGS

The above and/or other aspects will be more apparent from the detailed description of exemplary embodiments with reference to the accompanying drawings, in which.

DETAILED DESCRIPTION OF EXEMPLARY EMBODIMENTS

Certain exemplary embodiments are described in greater detail with reference to the accompanying drawings.

Figure 1:
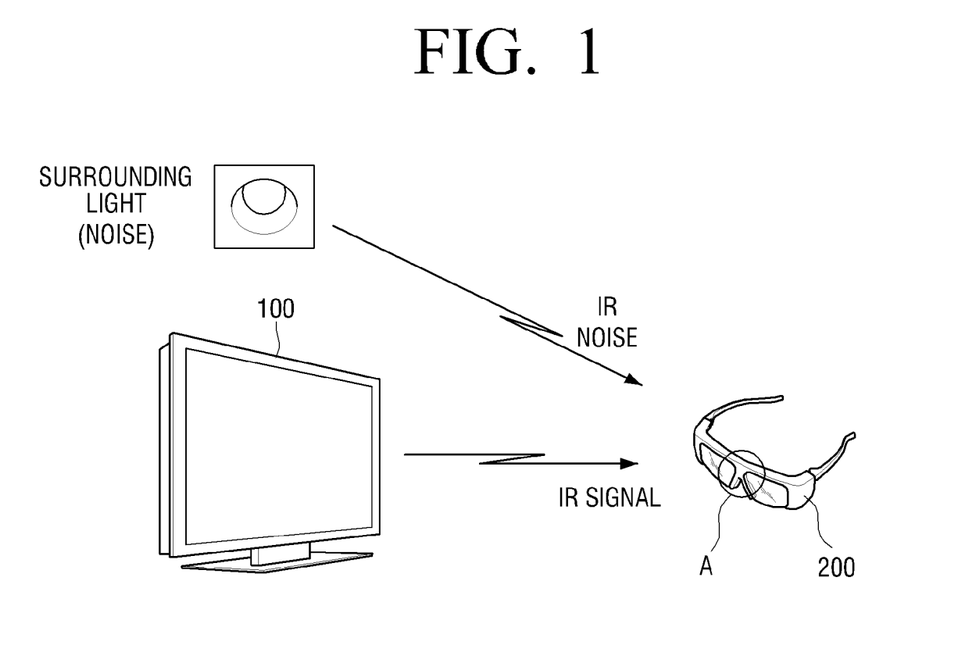
FIG. 1 illustrates a 3D image provision system according to an exemplary embodiment.

FIG. 1 illustrates a 3D image provision system according to an exemplary embodiment. As illustrated, a display apparatus 100 for displaying 3D images on a screen and 3D glasses 200 for viewing the 3D images are provided.

The display apparatus 100 is designed to display 3D images. For example, the display apparatus 100 may be designed to display two-dimensional (2D) images or 3D images.

In the case where the display apparatus 100 displays 2D images, the display apparatus 100 may use the same method as a conventional 2D display apparatus, and in the case where the display apparatus 100 displays 3D images, the display apparatus 100 may receive 3D images from an image photographing device such as a camera or may receive 3D images transmitted from a broadcasting station which have been taken by a camera and then edited/processed in the broadcasting station, then the display apparatus 100 may process the received 3D images and display them on the screen. In particular, the display apparatus 100 may process a left eye image and a right eye image based on a format of the 3D images, and then enables the processed left eye image and the right eye image to be time-shared and alternately displayed.

The 3D glasses 200 may be active type shutter glasses. That is, a controller chip in the shutter glasses recognizes left/right image signals transmitted from the display apparatus 100 and then either transmits the images or blocks the images as it quickly opens and closes liquid crystals, thereby generating binocular disparity.

Particularly, the 3D glasses 200 may include an IR receiving unit A for receiving a sync signal from the display apparatus 100.

The IR receiving unit A may include an IR sensor unit (see FIGS. 3A-3D) which receives a sync signal transmitted from the display apparatus 100, and a window unit (See FIGS. 3A-3D) which transmits the sync signal to the IR sensor unit and which transmits an external light such as a noise light in a direction other than the direction of the IR sensor unit. Other details regarding the IR receiving unit A will be explained hereinafter with reference to the figures.

Meanwhile, an image provision system according to an exemplary embodiment may further include a camera (not illustrated) for generating 3D images.

The camera is a type of a photographing device for generating 3D images. It generates left eye images photographed to be provided to a left eye of a user and right eye images photographed to be provided to a right eye of the user. That is, a 3D image consists of a left eye image and a right eye image which are provided to the left eye and the right eye of the user alternately, thereby generating a stereoscopic effect due to the binocular disparity between the left and right eyes.

To this end, the camera consists of a left eye camera for generating left eye images and a right eye camera for generating right eye images, and the distance between the left eye camera and the right eye camera is determined based on an approximate distance between the left eye and the right eye of a person.

The camera sends the photographed left eye images and right eye images to the display apparatus 100. In particular, the left eye images and right eye images that the camera sends to the display apparatus 100 may be sent in a format where a frame consists of only one of the left eye image or the right eye image or in a format where a frame consists of both the left eye image and the right eye image.

The camera may pre-determine one format from among various 3D image formats, generate 3D images according to the determined format, and send the generated 3D images to the display apparatus 100.

Hereinafter, a configuration of 3D glasses according to an exemplary embodiment will be explained in greater detail.

Figure 2:
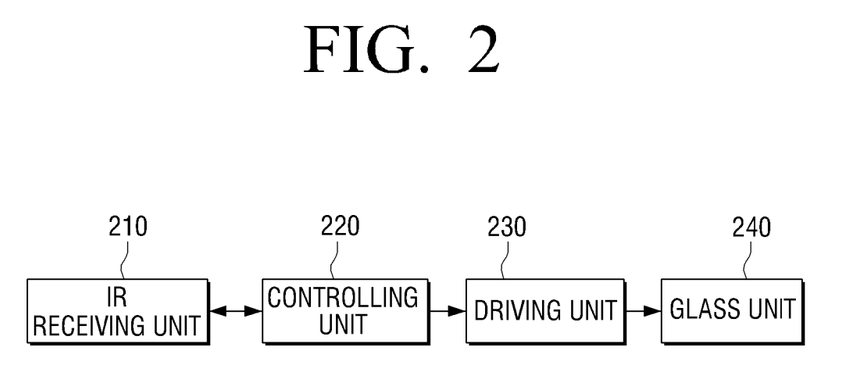
FIG. 2 is a block diagram of a structure of 3D glasses according to an exemplary embodiment.

FIG. 2 is a block diagram showing a configuration of 3D glasses according to an exemplary embodiment.

According to FIG. 2, the 3D glasses 200 include an IR receiving unit 210, a controlling unit 220, a driving unit 230, and a glass unit 240.

The IR receiving unit 210 receives a sync signal regarding 3D images from an IR transmitting unit (see FIG. 6) of the 3D display apparatus 100 connected wirelessly. In particular, the IR transmitting unit emits the sync signal using an infrared ray having a straight characteristic, and the IR receiving unit 210 receives the sync signal from the emitted infrared ray.

For example, the sync signal transmitted from the IR transmitting unit to the IR receiving unit 210 may be a signal where a high level and a low level are alternated at a predetermined time interval, and it may be embodied so that at a high level time the left eye image is transmitted and at a low level time the right eye image is transmitted.

In addition, the IR receiving unit 210 may include an IR sensor unit (see FIGS. 3A-3D) which receives the sync signal transmitted from the 3D display apparatus 100 and a window unit (see FIGS. 3A-3D) which transmits the sync signal to the IR sensor unit and transmits an external infrared ray in a direction other than the direction of the IR sensor unit.

Furthermore, the window unit may include a window (see FIGS. 3A-3D) having a surface having a predetermined curvature and a blocking unit (see FIGS. 3A-3D) disposed on at least one side of the window.

More specifically, the window unit has a surface with a predetermined curvature, to transmits the sync signal in the direction of the IR sensor unit, and to transmits a first external infrared ray, incident from a direction of the surrounding area other than the direction of the 3D display apparatus 100, in a direction other than the direction of the IR sensor unit. It is to be understood that "a direction of the surrounding area other than the direction of the 3D apparatus 100" presumes that the 3D glasses 200 are in a position for a user to be viewing the 3D apparatus 100. In other words, the 3D glasses 200 are "pointed at" the 3D apparatus 100.

In addition, the blocking unit is disposed on at least one side of the window and may block a second external infrared ray incident from a direction of the surrounding area other than the direction of the 3D display apparatus 100.

The IR receiving unit 210 transmits the sync signal received as above to the controlling unit 220.

The controlling unit 220 controls the overall operation of the 3D glasses 200. Particularly, the controlling unit 220 generates a controlling signal based on the sync signal received from the IR receiving unit 210, transmits the generated controlling signal to the driving unit 230, thereby controlling the driving unit 230. Particularly, the controlling unit 220 controls the driving unit 230 so that a driving signal for driving the glass unit 240 can be generated in the driving unit 230 based on the sync signal.

For example, the driving unit 230 may include a shutter driving unit (not illustrated) for driving a shutter of the glass unit 240.

The shutter driving unit generates a shutter driving signal based on the control signal received from the controlling unit 220. In particular, since the glass unit 240, which will be explained hereinafter, consists of a left eye glass and a right eye glass, the shutter driving unit generates a left eye shutter driving signal for driving the shutter of the left eye glass and a right eye shutter driving signal for driving the shutter of the right eye glass, and transmits the generated left eye shutter driving signal to the left eye glass and transmits the right eye shutter driving signal to the right eye glass.

As aforementioned, the glass unit 240 consists of a left eye glass and a right eye glass. In addition, the glass unit 240 opens and closes each glass according to the shutter driving signal received from the shutter driving unit.

The shutter of the left eye glass and the right eye glass may be liquid crystal units. That is, the glass unit 240 may open or close the shutters using the liquid crystal of the left eye glass and the right eye glass.

The power supply unit (not illustrated) supplies power to the 3D glasses. The power state of the power supply unit is controlled by the controlling unit 220. That is, since the 3D glasses 300 need to be portable, in many cases the power is supplied through a separate battery.

Light of the image output from the display apparatus 100 may be in a polarized state. In particular, if the display apparatus 100 is a liquid crystal display (LCD) TV, the light output from the screen is output in the state where the light is polarized in a particular direction.

Furthermore, the shutters of the left eye glass and the right eye glass of the 3D glasses 200 may also include liquid crystal. thus, the left eye glass and the right eye glass of the 3D glasses 200 may be polarized by application of electric fields to the liquid crystal.

The above exemplary embodiment presumes that a same or similar wavelength bandwidth is used such that the sync signal of the 3D glasses 200 and the display apparatus 100 and an external infrared ray received at the 3D glasses 200 generate signal interference, but such a case was for one exemplary embodiment, and in some cases the sync signal and the external infrared ray may have different wavelength bandwidths.

FIGS. 3A-3D are figures illustrating a configuration of an IR receiving unit according to various exemplary embodiments.

As illustrated in FIG. 1, an IR receiving unit 210 may be located in a middle area of the 3D glasses 200. However, according to alternate embodiments the IR receiving unit 210 may be located in any portion of the 3D glasses 200 as long as it is in a location where it could effectively receive a sync signal from the display apparatus 100, when the glasses are facing the display apparatus 100.

Figure 3A:
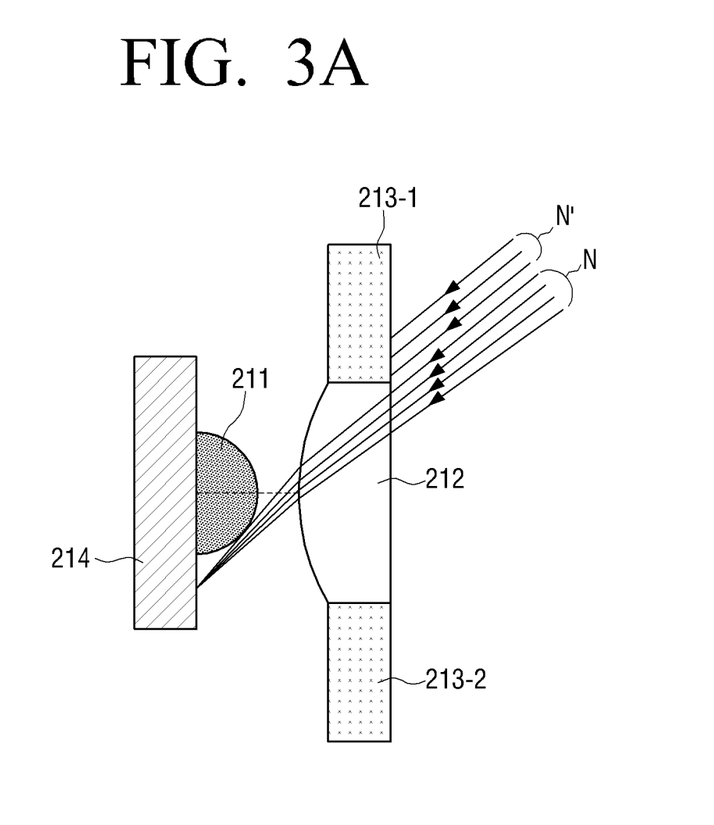
FIGS. 3A to 3D illustrate a structure of an IR receiving unit according to various exemplary embodiments.

According to FIG. 3A, the IR receiving unit 210 includes the IR sensor unit 211, a window unit, and a circuit unit 214.

In addition, the window unit includes the window 212 and the blocking units 213-1, 213-2.

When facing the display apparatus 100, the IR sensor unit 211 receives the sync signal transmitted from the 3D display apparatus 100 and transmits it to the circuit unit 214 which includes a controller.

The window 212 and blocking units 213-1 and 213-2 of the window unit transmits the sync signal transmitted from the 3D display apparatus 100 to the IR sensor unit 210, and transmits external light in a direction other than the direction of the IR sensor unit 211. Herein, the external light may be illuminating light or noise.

Herein, the window 212 has a surface having a predetermined curvature, to transmit the sync signal in the direction of the IR sensor unit 210, and to transmit a first external infrared ray N, incident from a direction of the surrounding area other than the direction of the 3D display apparatus 100, in a direction other than the direction of the IR sensor unit 210.

More specifically, the window 212 may be in a shape of a convex lens of which at least one side has a predetermined curvature. Accordingly, the external light incident on the predetermined area, for example an external infrared ray, may be made to be transmitted in a direction other than the direction of the IR sensor unit 210. For example, the external light incident on the upper side of the middle of the IR sensor unit 210, or on the right or left of the middle of the IR sensor unit, may be made to be transmitted in a direction other than the direction of the IR sensor unit 210.

Furthermore, the blocking units 213-1, 213-2 are disposed on at least one side of the window 212, blocking a second external infrared ray N' incident from a direction of the surrounding area other than the direction of the 3D display apparatus 100.

The circuit unit 214 may be a circuit substrate including a controller chip which is capable of receiving the sync signal received through the IR sensor unit 211 and controlling the 3D glasses 200.

Figure 3B:
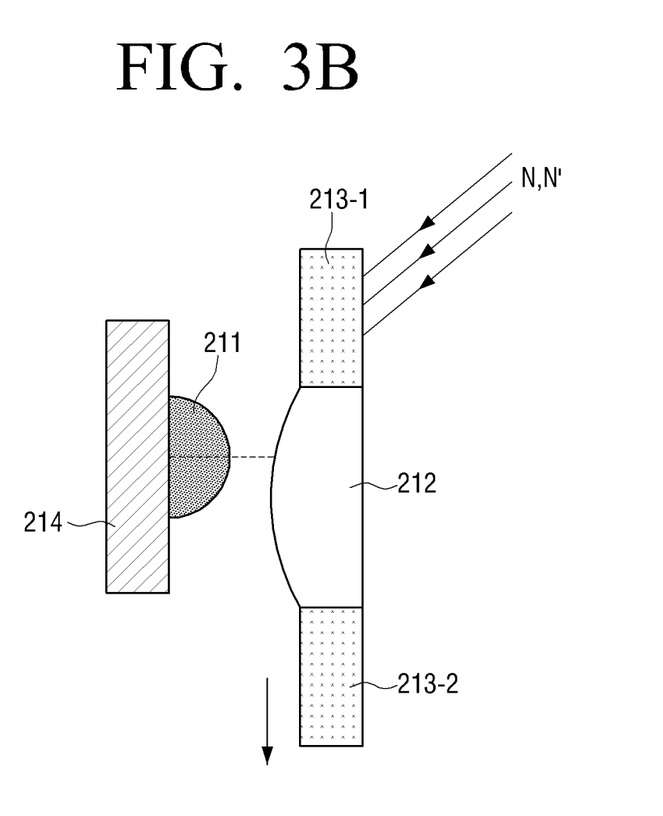

According to FIG. 3B, the middle of the window 212 may be disposed on the lower side of the middle of the IR sensor unit 211, enabling the blocking unit 213-1 located on the upper side of the window 212 to block the first and second external infrared rays N, N'. That is, the noise light N, N' directed to the upper side of the middle of the IR sensor unit 211 can be blocked.

Figure 3C:
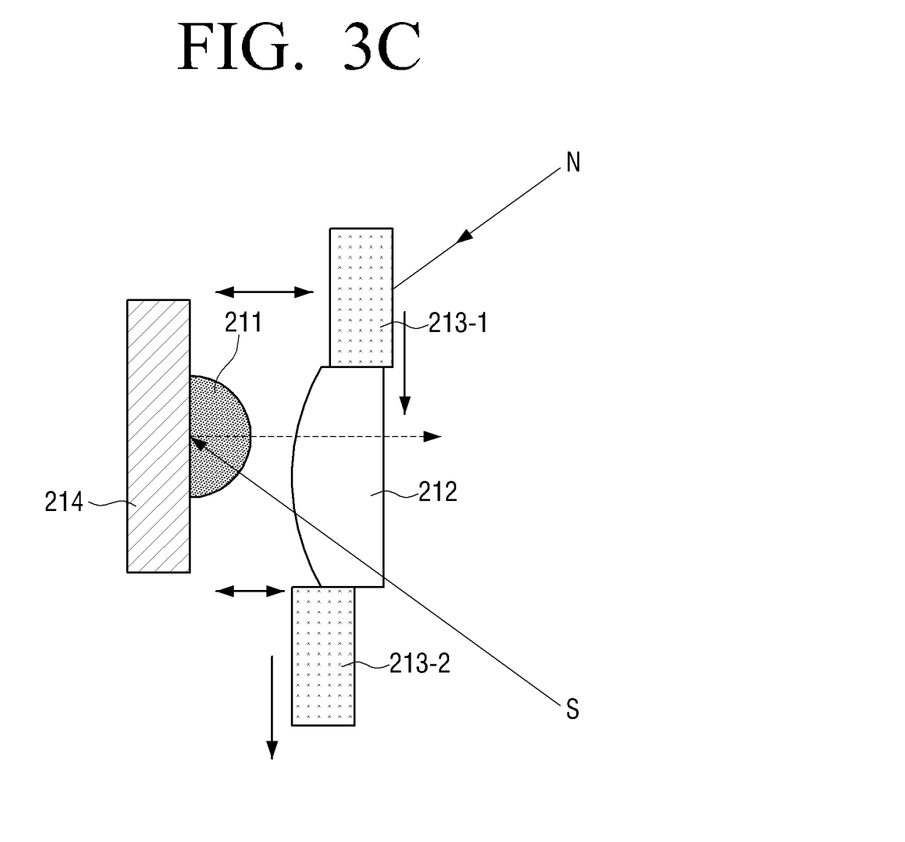

According to FIG. 3C, a horizontal distance from the IR sensor unit 211 to the upper blocking unit 213-1 may be different from a horizontal distance from the IR sensor unit 211 to the lower blocking unit 213-2.

More specifically, the horizontal distance from the IR sensor unit 211 to the upper blocking unit 213-1 may be larger than the horizontal distance from the IR sensor unit 211 to the lower blocking unit 213-2. Accordingly, it may be made so that a signal light S can be transmitted to the IR sensor unit 211 without any hindrance by adjusting the light reception angle of the signal light S incident on a lower part of the IR sensor unit 211.

Figure 3D:
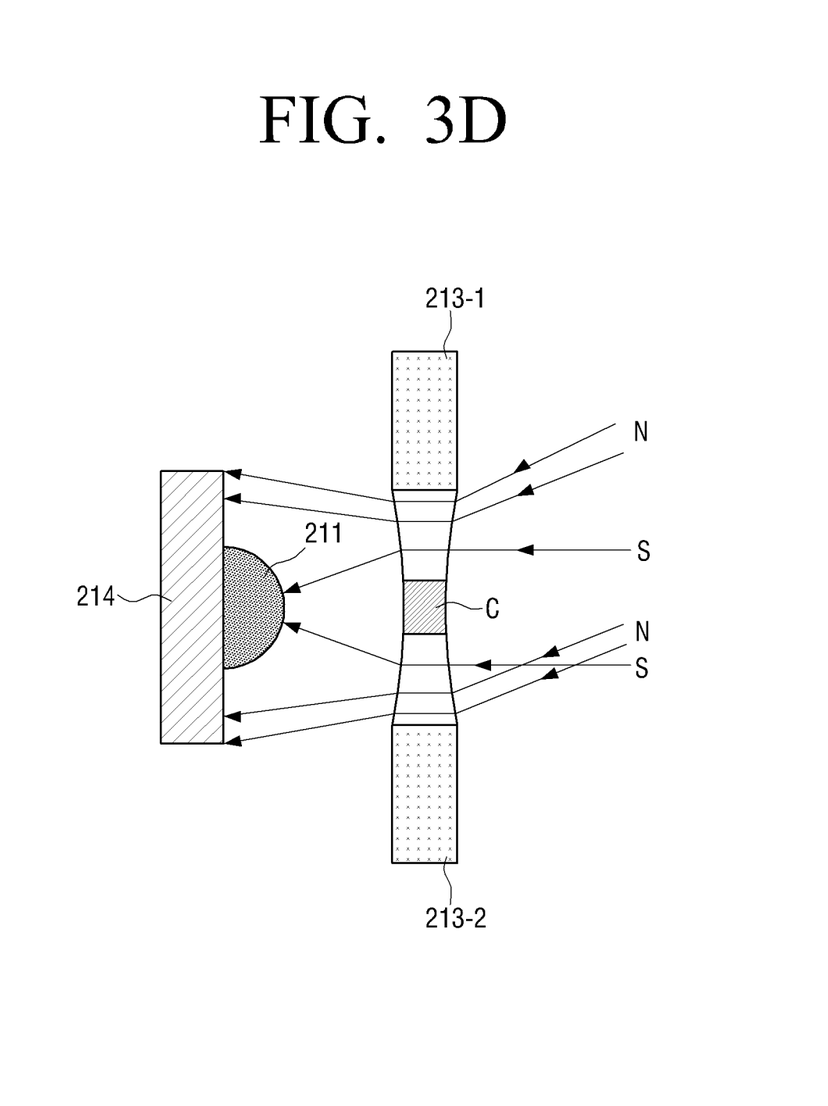

According to FIG. 3D, the window 212 may include a concave lens according to circumstances.

In this case, the light N incident from the upper direction can be blocked and the signal light S can be directed to the sensor unit 211. A central blocking unit C may also be provided.

Meanwhile, in an exemplary embodiment according to FIGS. 3A to 3D, specific aspects of the structure and design of the exemplary configurations of the IR receiving unit have been illustrated in the figures, but these are merely exemplary embodiments, and thus, one of skill in the art would understand that various modifications can be made.

Figure 4A:
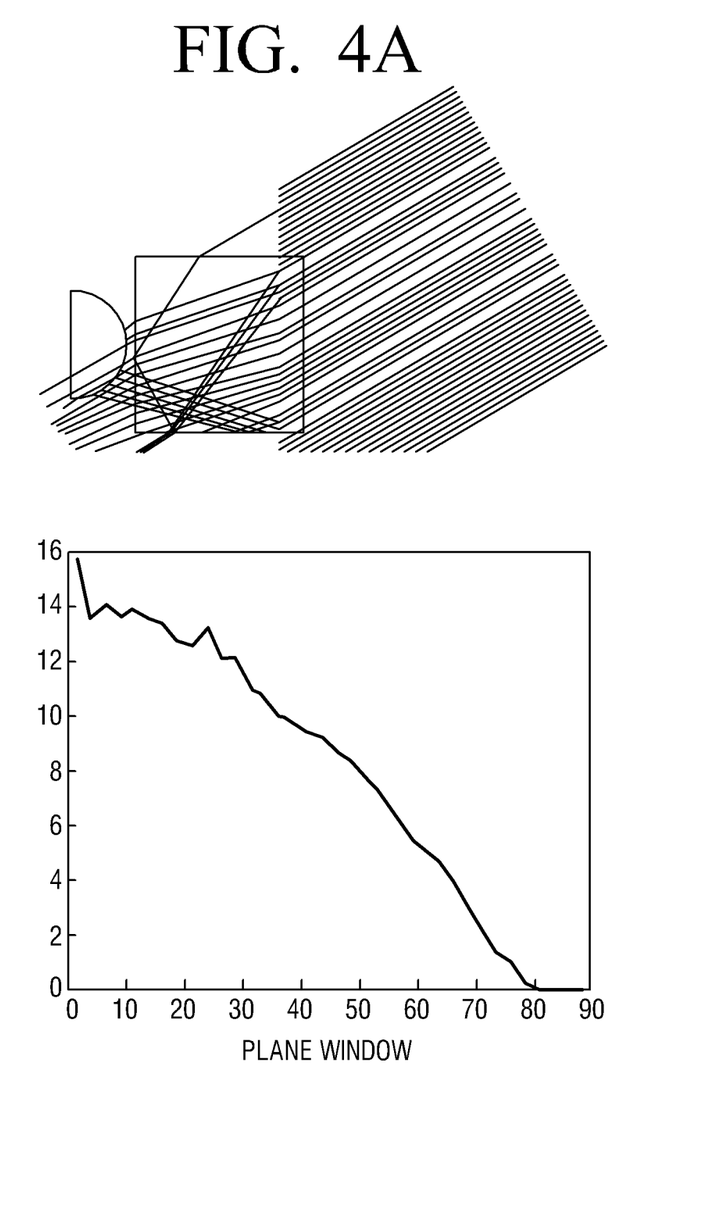
FIGS. 4A to 4B illustrate effects of a window having a curvature according to an exemplary embodiment.
Figure 4B:
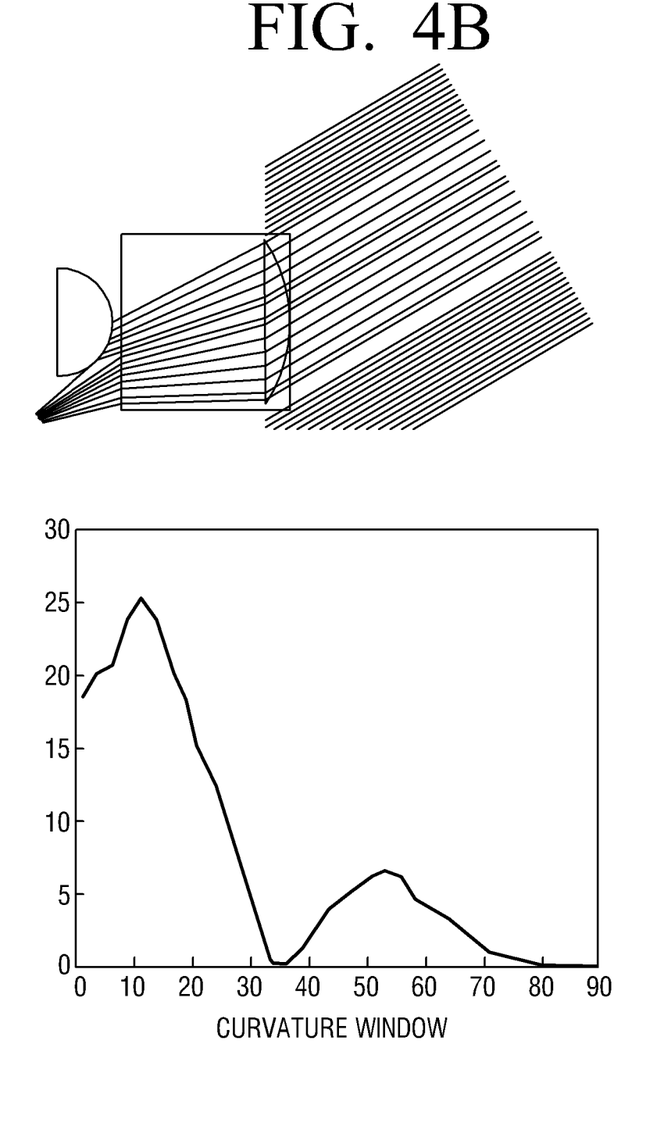

FIGS. 4A and 4B are figures illustrating the effects of the window having a curvature according to an exemplary embodiment.

FIG. 4A shows that an external light can be transmitted to the sensor unit in the case where external light is incident from an upper direction through a conventional plane window.

FIG. 4B shows that external light may be transmitted in a direction other than the direction of the sensor unit in the case where external light is incident from an upper direction when the window includes a convex lens.

Figure 5:
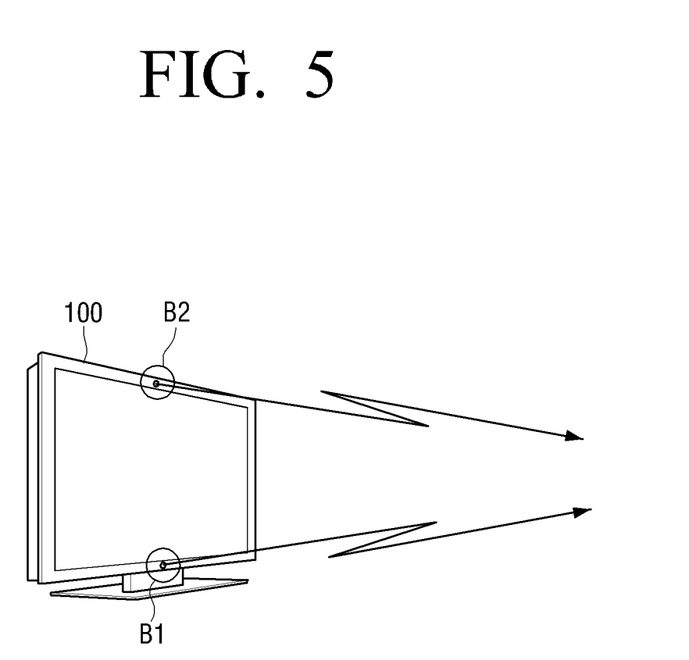
FIG. 5 mimetic diagram of a configuration of a display apparatus according to an exemplary embodiment.

FIG. 5 is a mimetic diagram illustrating a configuration of a display apparatus according to an exemplary embodiment.

According to FIG. 5, the display apparatus 100 may have not only a lower IR transmitting unit B1 but also an upper IR transmitting unit B2. Accordingly, it can be made to transmit the IR sync signal to the 3D glasses 200 through not only the lower IR transmitting unit B1 but also the upper IR transmitting unit B2, thereby increasing the transmission efficiency of the IR sync signal.

Figure 6:
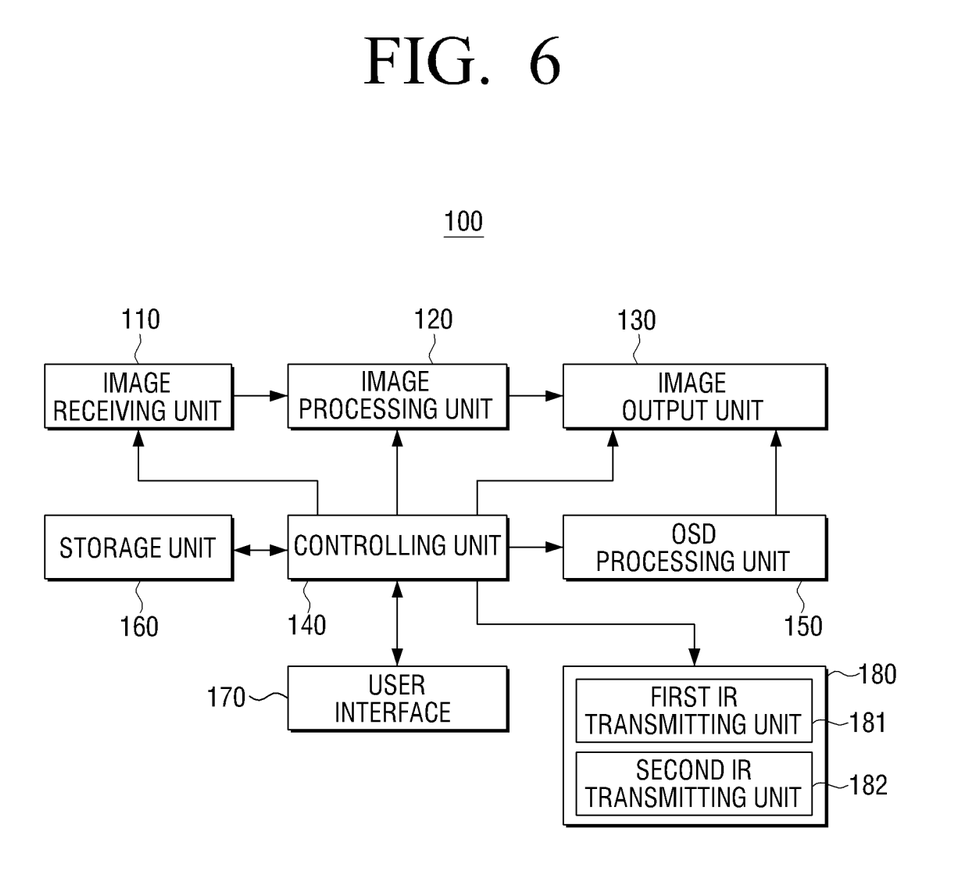
FIG. 6 is a block diagram of the configuration of the display apparatus according to an exemplary embodiment.

FIG. 6 is a block diagram illustrating a configuration of the display apparatus according to an exemplary embodiment.

According to FIG. 6, the display apparatus 100 has an image receiving unit 110, an image processing unit 120, an image output unit 130, a controlling unit 140, an on screen display (OSD) processing unit 150, a storage unit 160, a user interface unit 170, and an IR transmitting unit 180.

The image receiving unit 110 receives 2D or 3D image signals from a broadcasting station or a satellite and modulates the received signals. The signals may be received wirelessly or through a cable. In addition, the image receiving unit 110 may be connected to an external device such as a camera and receive inputs of 3D images from the external device. The external device may be connected wirelessly, or via a wire or cable such as a Separate Video (S-Video) connector, a composite connector, a D-Sub connector, a digital visual interface (DVI) connector, and a High-Definition Multimedia Interface (HDMI™) connector. 2D image processing methods are obvious technologies for those skilled in the art and thus 3D image processing methods will be mainly explained hereinafter.

As aforementioned, a 3D image is an image consisting of at least one frame, such that one image frame may include either or both a left eye image and a right eye image. That is, a 3D image is an image generated according to one of various 3D formats.

Therefore, the 3D image received by the image receiving unit 110 may have various formats. In particular, it may be in one of the following formats: the general top-bottom type, side by side type, horizontal interleave type, vertical interleave type, checker board type, and sequential frame type.

The image receiving unit 110 transmits the received 2D or 3D image to the image processing unit 120.

The image processing unit 120 performs a signal processing or Graphic User Interface (GUI) adding operations such as video decoding, format analyzing, and video scaling on the 2D or 3D images received by the image receiving unit 110.

In particular, the image processing unit 120 generates a left eye image and a right eye image according to the size of a screen (for example, 1920×1080) using the format of the 2D or 3D images received by the image receiving unit 110.

For example, in the case where the format of the 3D image is a format according to a top-bottom type, a side by side type, a horizontal interleave type, a vertical interleave type, a checker board type, or a sequential frame type, the image processing unit 120 extracts each of the left eye image portion and the right eye image portion from each image frame, and expansively scales or interpolates the extracted left eye image and the right eye image, thereby generating the left eye image and the right eye image to be provided to the user.

In addition, in the case where the format of the 3D image is the general frame sequential type, the image processing unit 220 extracts the left eye image or the right eye image from each frame and make preparations to provide the image to the user.

The information on the format of the input 3D image may or may not be included in the 3D image signal.

For example, in the case where the information on the format of the input 3D is included in the 3D image signal, the image processing unit 120 analyzes the 3D image and extracts the information on the format, and then processes the received 3D image according to the extracted information. On the other hand, in the case where the information on the format of the input 3D image is not included in the 3D image signal, the image processing unit 120 processes the received 3D image according to either a format input by the user or a predetermined format.

The image processing unit 120 time shares the extracted left eye image and the right eye image, and transmits the images to the image output unit 130 alternately. That is, the image processing unit 120 transmits the left eye image and the right eye image in the following time order: left eye image L1>right eye image R1>left eye image L2>right eye image R2>....

The image output unit 130 outputs the left eye image and the right eye image output from the image output unit 120 alternately and provides the images to the user.

The controlling unit 140 controls the overall operations of the display apparatus 100 according to the user command transmitted from the user interface unit 170 or according to predetermined options.

In particular, the controlling unit 140 controls the image receiving unit 110 and the image processing unit 120 so that the 3D image is received, the received 3D image is divided into the left eye image and the right eye image, and each of the divided left eye image and the right eye image is scaled or interpolated to the size that can be displayed on one screen.

In addition, the controlling unit 140 may control the image output unit 130 so that the polarization direction of the image provided through the image output unit 130 can be switched for the left eye image and the right eye image consistently.

In addition, the controlling unit 140 may control the operations of the OSD processing unit 150 which will be explained hereinafter.

The OSD processing unit 150 generates an OSD screen which is overlapped and displayed on the 2D or 3D image output from the image output unit 130.

The OSD screen is a screen which displays letters or figures such as a menu screen on the display screen, time or channel numbers, and can be overlapped and displayed in the display image.

For example, as the user manipulates input devices such as a manipulation panel or remote controller in order to select a function from the menus, the main menu or the sub menu may be displayed in an OSD type on the display screen.

Such menus may include the option items that can be selected in the display device or include the items that can adjust the functions of the display apparatus.

The OSD processing unit 150 may perform operations such as 2D/3D switching and operations for adjusting a transparency, color, size, shape, location, highlighting, and animation effects of the OSD screen according to the control of the controlling unit 140.

In addition, the OSD processing unit 150 may generate the OSD screen as a 2D screen or a 3D screen according to a predetermined option, predetermined event or a user command.

The controlling unit 140 may control the OSD processing unit 140 so that it adjusts the transparency of the OSD screen when the 3D image is displayed in the image output unit 130.

In addition, the controlling unit 140 may control the OSD processing unit 140 so that it adjusts the transparency of the OSD screen when at least one of the image displayed in the image output unit 140 and the OSD screen is 3D.

Furthermore, the controlling unit 140 may control the OSD processing unit 150 so that the transparency of the OSD screen is automatically reduced when the image displayed in the image output unit 130 is converted from 2D to 3D according to a predetermined option (or a predetermined event). For example, the controlling unit 140 may control the OSD processing unit 150 so that the transparency of the OSD screen has a nontransparent state or a transparency near non-transparency. Herein, non-transparency may mean a transparency almost near 0, but may also mean a non-transparency state having a predetermined error range.

In addition, the controlling unit 140 may control the OSD processing unit 150 so that the transparency of the OSD screen is increased automatically when the image displayed in the image output unit 130 is converted from 3D to 2D according to a predetermined option. For example, the controlling unit 140 may control the OSD processing unit 150 so that the transparency of the OSD screen is semi-transparent.

Furthermore, when the OSD screen is 3D and the image displayed in the image output unit 130 is converted from 3D to 2D, the controlling unit 140 may control the OSD processing unit 150 so that the conversion to 2D can be made while maintaining the transparency of the OSD screen.

The storage unit 160 is a storage medium where various programs needed to operate the 3D image display apparatus 100 are stored, and may be embodied as a memory or a Hard Disk Drive (HDD). For example, the storage unit may have a ROM for storing a program to perform operations of the controlling unit 140 and an RAM for temporarily storing data according to the operation performance of the controlling unit 140. In addition, it may further have an Electrically Erasable and Programmable ROM (EEROM) for storing various reference data.

The user interface unit 170 transmits the user command received from an input means such as a remote controller and an input panel.

The IR transmitting unit 180 generates a sync signal synchronized with the left eye image and the right eye image which are output alternately, and transmits the generated sync signal to the 3D glasses 200 as an infrared ray. This is to make the 3D glasses 200 open and close alternately, so that the left eye image is displayed in the image output unit 130 at a left eye opening timing of the 3D glasses 200 and that the right eye image is displayed in the image output unit 130 at a right opening timing of the 3D glasses 200.

In particular, the IR transmitting unit 180 may include a first IR transmitting unit 181 and a second IR transmitting unit 182 provided at the upper end and lower areas of the display apparatus 100 as illustrated in FIG. 5. Accordingly, it becomes possible to increase the sync signal transmission efficiency.

As aforementioned, according to exemplary embodiments, the IR window may be embodied to have a curvature so as to adjust the light angle regarding the light transmitted to the IR window.

In addition, the light angle of an external light such as noise light and illumination light can be adjusted by the location of the upper end portion of the IR blocking unit, and the light angle of the light signal can be adjusted by the location of the lower end portion of the IR blocking unit.

Furthermore, it is possible to adjust the light angle of the light signal to be within a light reception angle while it is possible to adjust the light angles of the external light, such as noise light and illumination light, to be outside the light reception angle, so that the signal light and external light are divided clearly, thereby significantly increasing the signal to noise (S/N) ratio.

Although a exemplary embodiments have been shown and described, it would be appreciated by those skilled in the art that changes may be made in these embodiments without departing from the principles and spirit of the inventive concept, the scope of which is defined in the claims and their equivalents.

What is claimed is:
1. Three-dimensional (3D) glasses comprising:
a glass unit;
a glass driving unit which drives the glass unit;
an infrared (IR) sensor unit;
a window unit which receives a sync signal transmitted from a 3D display apparatus, transmits the sync signal to the IR sensor unit, and transmits external IR light away from the IR sensor unit; and a controlling unit which controls the glass driving unit based on the sync signal, wherein the window unit is disposed in front of the IR sensor unit, wherein the window unit includes a lens having a first side that faces the IR sensor unit and a second side that faces away from the IR sensor unit, and a blocking unit which is disposed on at least one side of the window and blocks second external IR light, wherein the second external IR light is light incident on the blocking unit from a direction different from the direction of the 3D display apparatus, wherein the first side of the lens is curved so as to transmit the sync signal to the IR sensor unit and to transmit the external IR light away from the IR sensor unit, wherein the blocking unit comprises an upper blocking unit disposed on an upper side of the lens and a lower blocking unit disposed on a lower side of the lens, and a horizontal distance from a middle of the IR sensor unit to the upper blocking unit is different from a horizontal distance from the middle of the IR sensor unit to the lower blocking unit.

2. The 3D glasses according to claim 1, wherein the window unit comprises:

a window having a surface having a curvature which transmits the sync signal in a direction of the IR sensor unit, and transmits first external IR light away from the IR sensor unit, wherein the first external IR light is light incident on the lens from a direction different from a direction of the 3D display apparatus.

3. The 3D glasses according to claim 2, wherein the blocking unit comprises an upper blocking unit disposed on an upper side of the lens and wherein an optical axis of the lens is downwardly offset from a middle of the IR sensor unit.

4. The 3D glasses according to claim 2, wherein at least one surface of the lens comprises a convex lens.

5. The 3D glasses according to claim 1, wherein the horizontal distance from the middle of the IR sensor unit to the upper blocking unit is larger than the horizontal distance from the middle of the IR sensor unit to the lower blocking unit.

6. The 3D glasses according to claim 1, wherein the external IR light comprises at least one of illumination light or noise light.

7. The 3D glasses according to claim 1, wherein the external IR light is incident on the window unit from an upper side, a left side, or a right side of the window unit.

* * * * *